United States Patent
Guez et al.

(10) Patent No.: US 6,793,144 B2
(45) Date of Patent: Sep. 21, 2004

(54) MEANS FOR COMMUNICATING WITH USB SMART CARDS USING FULL-SPEED OR HIGH-SPEED TRANSFERS

(75) Inventors: Gregory Guez, Marseille (FR); Alain Peytavy, Aix-en-Provence (FR)

(73) Assignee: Atmel Corporation, San Jose, CA (US)

( * ) Notice: Subject to any disclaimer, the term of this patent is extended or adjusted under 35 U.S.C. 154(b) by 144 days.

(21) Appl. No.: 10/412,525

(22) Filed: Apr. 10, 2003

(65) Prior Publication Data

US 2004/0134992 A1 Jul. 15, 2004

(30) Foreign Application Priority Data

Jan. 10, 2003 (FR) ............................................ 03 00251

(51) Int. Cl.$^7$ .............................................. G06K 19/06
(52) U.S. Cl. ...................................................... 235/492
(58) Field of Search ................................ 235/375, 380, 235/492, 482; 710/315; 713/500

(56) References Cited

U.S. PATENT DOCUMENTS

| | | | |
|---|---|---|---|
| 5,712,472 A | * | 1/1998 | Lee ............................ 235/486 |
| 6,168,077 B1 | | 1/2001 | Gray et al. ................... 235/375 |
| 6,199,128 B1 | | 3/2001 | Sarat .......................... 710/102 |
| 6,343,364 B1 | * | 1/2002 | Leydier et al. ............. 713/500 |
| 6,439,464 B1 | | 8/2002 | Fruhauf et al. ............. 235/492 |
| 6,543,690 B2 | * | 4/2003 | Leydier et al. ............. 235/451 |
| 6,557,754 B2 | * | 5/2003 | Gray et al. .................. 235/375 |
| 2001/0011914 A1 | | 8/2001 | Pomet ......................... 327/165 |
| 2001/0055202 A1 | * | 12/2001 | Templeton et al. .......... 361/761 |
| 2002/0049887 A1 | * | 4/2002 | Takahashi .................... 711/115 |
| 2003/0155424 A1 | * | 8/2003 | Guion et al. ................. 235/492 |

FOREIGN PATENT DOCUMENTS

| | | |
|---|---|---|
| WO | 99/48039 | 9/1999 |
| WO | 99/49415 | 9/1999 |
| WO | 00/16255 | 3/2000 |
| WO | WO 00/23936 | 4/2000 |
| WO | 01/69881 | 9/2001 |
| WO | WO 02/11081 A1 | 2/2002 |

OTHER PUBLICATIONS

Webpage printout, Certified USB™, Introduction to USB On-the-Go, 1 page.
Website printout, Certified USB™, "Developers", 3 pages.
Website printout, Intel, "A Technical Introduction to USB 2.0", 6 pages.

* cited by examiner

*Primary Examiner*—Thien M. Le
*Assistant Examiner*—April Nowlin
(74) *Attorney, Agent, or Firm*—Thomas Schneck; Mark Protsik

(57) ABSTRACT

The present invention allows the use of low speed USB reader/connector to be use for full speed and high-speed transmission by introducing an accurate clock element into the smart card. In addition, the present invention eliminate the need of having a clock element in any USB compatible reader/connector, making the reader/connector a much simpler device that can be manufactured in a lower cost.

7 Claims, 5 Drawing Sheets

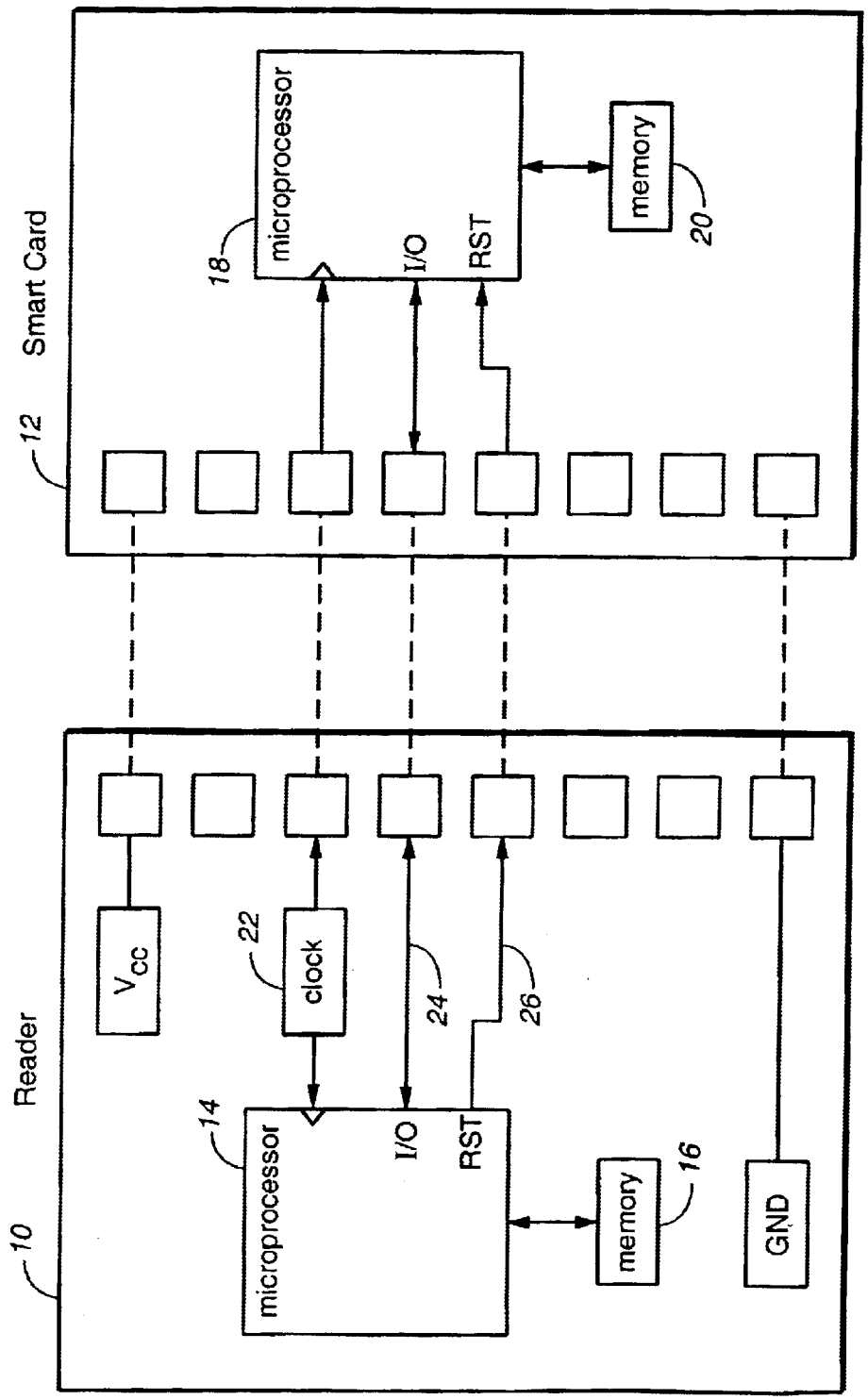
*FIG._1*
*(PRIOR ART)*

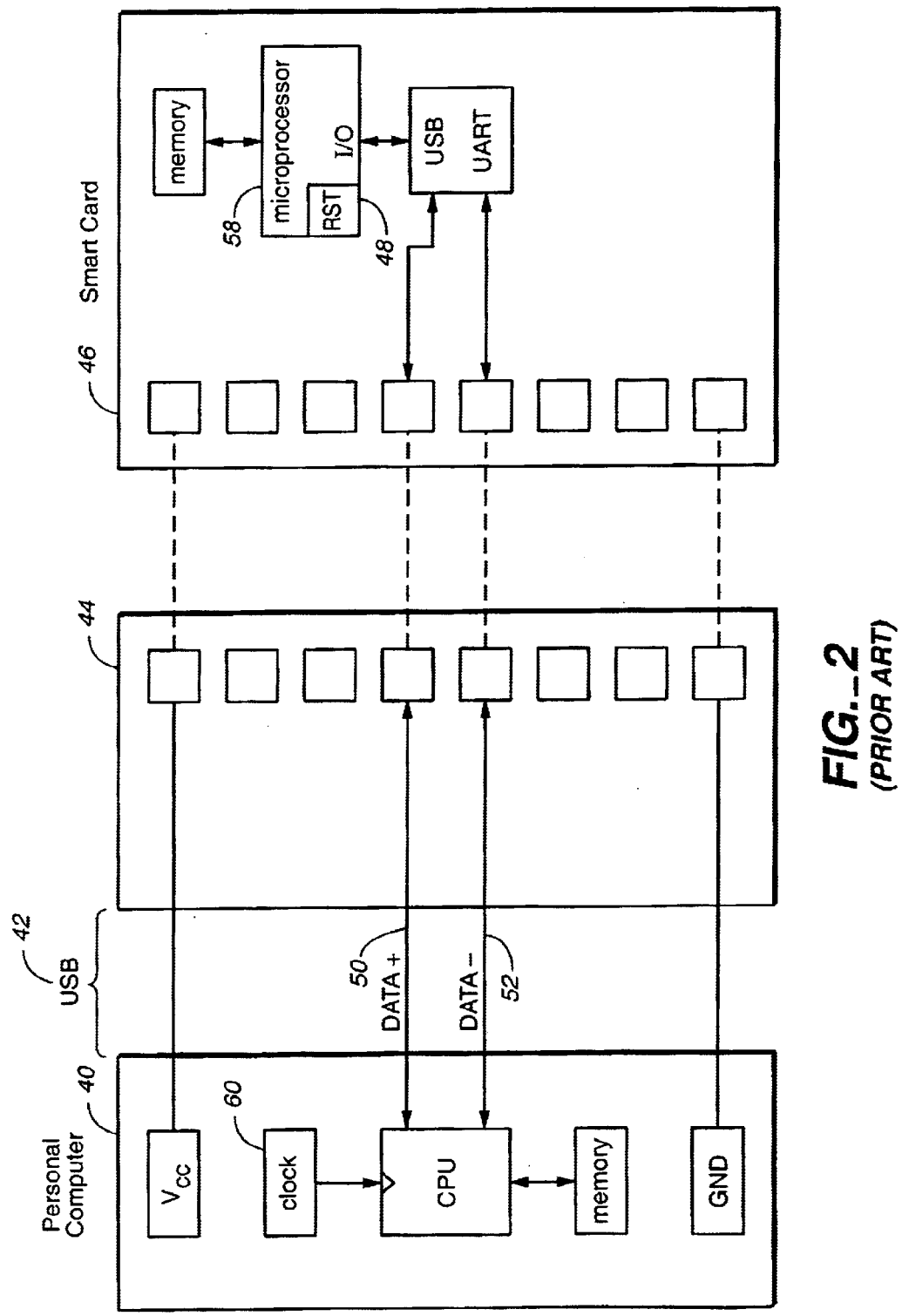
FIG._2
(PRIOR ART)

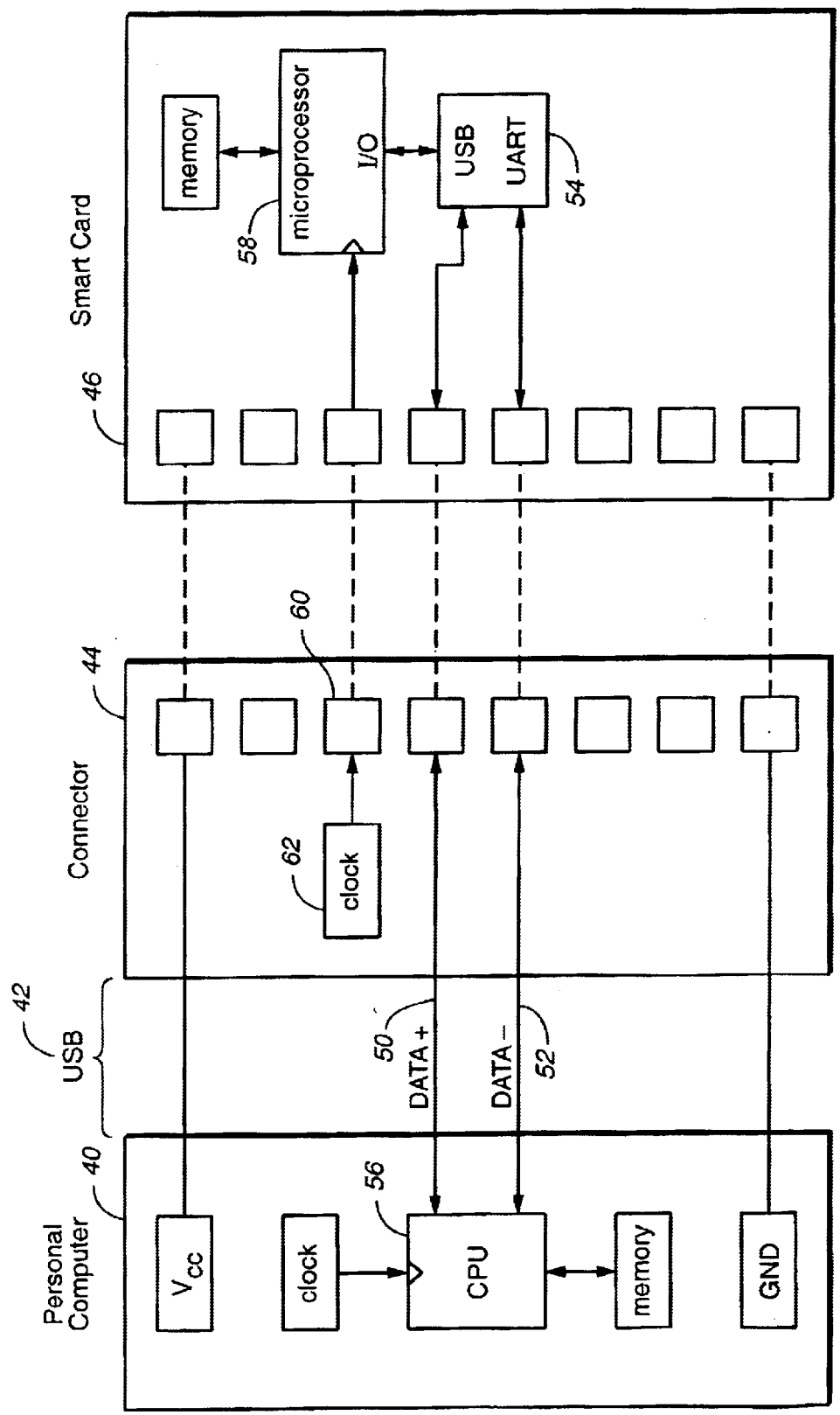
FIG._3
(PRIOR ART)

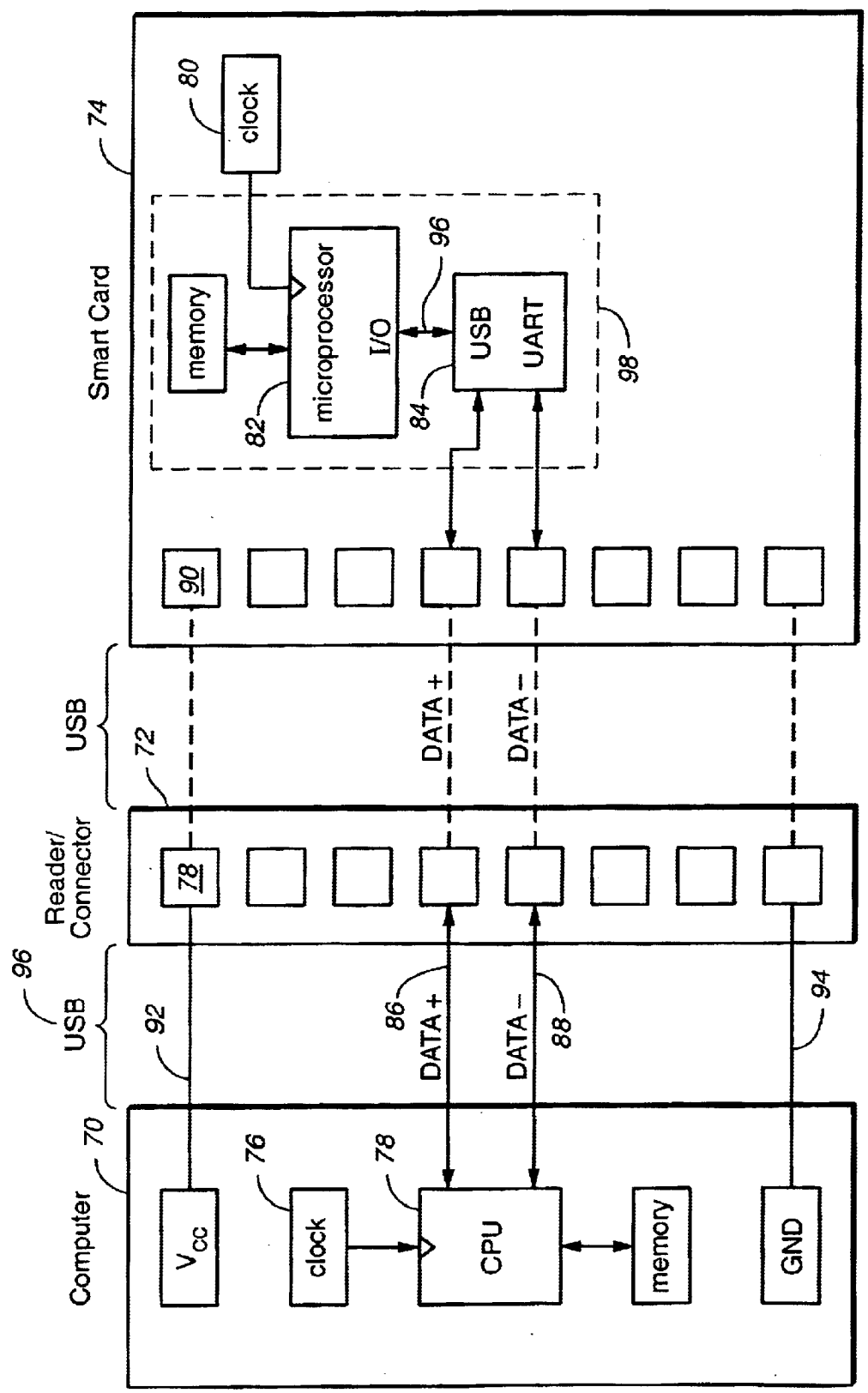
FIG._4

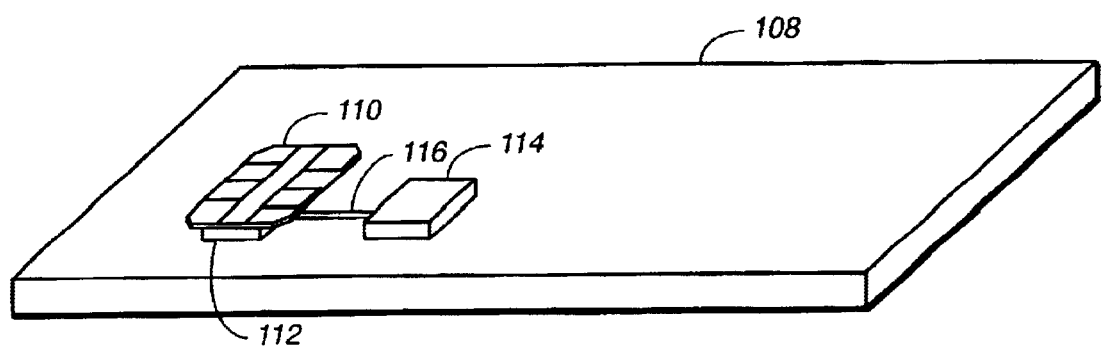
FIG._5
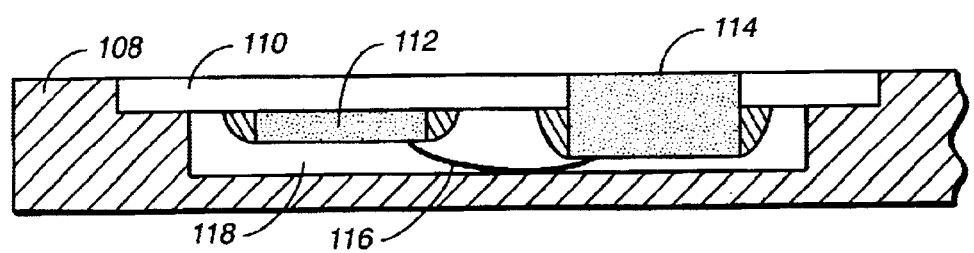
FIG._6

MEANS FOR COMMUNICATING WITH USB SMART CARDS USING FULL-SPEED OR HIGH-SPEED TRANSFERS

Technical Field

The present invention relates to communication interfaces for smart (IC) cards. In particular, the present invention relates to means that enable smart cards to communicate with a host through a universal serial bus (USB) connection in either full-speed or high-speed mode.

BACKGROUND ART

Smart cards typically communicate with a host terminal through a reader. In one type of system, the reader is also the host. In such system, the card is inserted into a slot in the reader, which brings electrical contacts in the reader into engagement with mating contacts on the exterior of the card. The engaged contacts enable a microcontroller in the reader to communicate with the memories and/or microprocessor in the smart card. Presently, most smart cards communicate with card readers in a manner compliant with the International Standards Organization/International Electrotechnical Commission (ISO) 7816. FIG. 1 is a block diagram showing the construction and connections of a stand-alone reader 10 and a smart card 12 connected according to a typical ISO-7816 connection scheme. Of the eight contact points available on a typical smart card system, the typical connection made use of five contact points: one for power supply, one for clock signal, one for data input/output, one for sending reset signals, and one for ground connection. A microprocessor 14 in the reader 10 receives clock signals from a clock 22 and inputs/output signals through the I/O line 24 and reset signal through the RST line 26.

Although the ISO-7816 is a well established and widely used standard, communication based on this standard is rather slow. Furthermore, as personal computers become ubiquitous and Universal Serial Bus (USB) connection a standard features in most PCs, smart card reader can be made cheaper by relocating the micro-processing and memory functions from the reader (the card contacting mechanism) to a separate host PC, so that the reader becomes a simple USB connector. The USB protocol is a private industry standard sponsored by USB Implementers Forum, Inc., a joint initiative of Intel, Hewlett-Packard, Lucent, NEC, Philips, Microsoft and others. The protocol works in conjunction with the IEEE 1394 standard connector.

FIG. 2 is a block diagram that shows a typical construction and connections of a smart card reading system that utilizes a computer and a USB connection. In FIG. 2, a personal computer 40 communicates with a smart card 46 via a USB cable connection 42 with a connector head 44 (the "card reader"), which calls for 4 wires: one for the power Vcc, one for the ground GND, and a pair of differential data transmission wire DATA+ 50 and DATA− 52. A first generation USB standard (version 1.1) allows transmission in two modes: a low speed mode and a full speed mode. For low speed transmissions, such as Control Transfer and Interrupt Transfer under USB 1.1, the data is clocked within the computer 40 at 1.5 Mbps with a data signaling tolerance of ± 1.5% (or 15,000 ppm). For full speed transfer such as Isochronous Transfer or Bulk Transfer under USB 1.1, the data is clocked at 12 Mbps with a data signaling tolerance of ± 0.25% (or 2,500 ppm). In addition to the two modes mentioned above, a newer USB standard (version 2.0) calls for a third (high speed) transmission mode where the data signaling rate is set at 480 Mbps with a data signaling tolerance of ± 500 ppm.

At any given speed of transmission, because the USB cable 42 does not have a separate wire to carry a clock signal, a clock generator has to be present at both ends of the cable 42. At the host end, most readers and computer systems have a highly accurate system clock 60 that can be use for both reception and transmission purposes. At the card end of the cable 42, a low cost electronic resonator 48 could be used for low speed transmission. Such resonators 48 are typically integrated into the smart card's microprocessor 58, as shown in FIG. 2. However, such a low cost resonator 48 is not accurate enough to clock transmissions at either full speed or high speed. Presently, in order to have a full speed or high-speed transmission system, an accurate clock element, such as a crystal oscillator, has to be introduced into the reader/connector. FIG. 3 shows a typical high speed USB reader/connector 44 that connects a highly accurate clock element 62 to one of the contact pins 60. Earlier generations of USB smart card connectors lacking an accurate clock element (FIG. 2) would become obsolete. However, since there is still a large installed base of low speed USB smart card connectors, it would be desirable to have a smart card that can use any of these connectors in a full speed or high speed transmission mode, regardless of whether the connector 44 has or does not have a clock inside.

Since having a clock element in the reader/connector adds complexity and thus cost to the manufacturing of the reader/connector, it would also be desirable to have a smart card system that eliminate the need for a clock element in the reader/connector module.

DISCLOSURE OF INVENTION

The present invention is a smart card that has a highly accurate clock element connected to its microprocessor. The incorporation of an accurate clock element enables the smart card to be used with any USB enabled smart card readers/connectors for either full speed or high-speed data transmission. The accurate clock element can be a clock ceramic oscillator, a resonator, or any vibrating device, provided that it has an accuracy sufficient to achieve at least full speed, and preferably also high speed, data transfer (e.g., an accuracy of at least 0.25%) and a thickness meeting standards for placement on smart cards (e.g., preferably not more than 0.6 mm).

BRIEF DESCRIPTION OF THE DRAWINGS

FIG. 1 is a block diagram showing the construction and connections of a stand-alone reader and a smart card connected according to a typical ISO-7816 connection scheme.

FIG. 2 is a block diagram that shows a typical prior art construction and connections of a low speed USB smart card reading system that utilizes a computer.

FIG. 3 is a block diagram that shows another prior art construction and connections of a high speed USB smart card reading system that utilizes a computer, with the USB connector head incorporating an accurate clock generating element.

FIG. 4 is a block diagram showing the construction and connection of a smart card system of the present invention.

FIG. 5 is a perspective view of a smart card with an embedded clock element according to the present invention.

FIG. 6 is a cross-sectional view of a smart card with an embedded clock element according the present invention.

BEST MODE OF CARRYING OUT THE INVENTION

In FIG. 4, an embodiment of the present invention is shown. In the figure, a host computer 70 is shown to have a clock element 76 connected to a CPU 78. The computer is connected to a USB reader/connector 72 through a USB cable connection 96 that consists of four wires: a power wire 92, a ground wire 94, a positive data wire 86 and a negative data wire 88. The positive data wire 86 and the negative data wire 88 together forms a differential data transmission pair. The reader/connector head 72 provides a docking place and a contact point for a smart card 74. It receives the USB cable 96 and makes each of the four cable signals available at one of eight contact points 78. The smart card 74 also has eight contact points 90 that match those of the reader/connector's 72. Four of the contact locations are unused in the present USB versions. The smart card 74 also includes a chip module 98. The chip module 98 includes a Universal Asynchronous Receiver/Transmitter (UART) module 84 and a microprocessor 82. The UART module 84 is coupled to the microprocessor 82 through an input/output line 96. The signal from the differential data transmission pair is connected to the UART module 84 in the smart card 74. The UART module 84 converts the signals on the differential data transmission wire into serial data that the microprocessor 82 on board of the smart card 74 can understand and relays the data to the microprocessor 82 through the input/output line 96. An accurate clock element 80, such as a ceramic resonator with an accuracy of at least 0.25%, embedded into the smart card 74 is connected to the microprocessor 82. Other types of electromechanical vibrating elements with the required accuracy for achieving at least full speed data transfer (preferably, supporting high speed transfer as well), and which are thin enough for use on a smart card, may be used. Furthermore, to properly incorporate the clock element into a smart card, the clock element generally cannot have a thickness of more than about 0.6 mm because present smart card standards specify a total card thickness of 0.84 mm. The clock element provides the timing means for the smart card to receive and transmit USB signals at either full speed or at high speed. The clock element on the card operates in the same manner as at other clock locations per the USB protocol.

FIG. 5 shows a perspective view of a smart card 108 of the present invention wherein a ceramic resonator 114 via the card is connected to a chip module 112 through a connecting wire 116. The chip module 112 can be connected to a reader/connector through a contact plate 110 with eight contact points. A cross-sectional view of the smart card is shown in FIG. 6. In FIG. 6, the chip module 112 and the ceramic resonator 114 is shown to reside within a receded area 118 in the smart card 108. The ceramic resonator 114 is shown to connect to the chip module 112 by a wire 116. In actual implementation, the connection can be achieved by other means, such as by mean of a strip of conductive glue. The contact plate 110 provides a means for outside connection for the chip module.

What is claimed is:

1. A smart card that is configured to communicate with a host in a universal serial bus (USB) standard protocol via a USB-compatible cable terminating in a card reader/connector head, the card comprising:
    a first contact point on the card that receives power signal from the host;
    a second contact point on the card that connects to a ground;
    third and fourth contact points on the card that cooperate to send and receive differential data signals;
    a chip module on the card that receives power and ground from said first and second contact points and sends and receives USB compatible data signals through said third and fourth contact points; and
    a clock module mounted on the card, the clock module having an accuracy sufficient to clock at least full speed data transfer of USB signals with any compatible host without regard to the type of reader/connector to which the card is connected.

2. The smart card of claim 1, wherein said chip module comprises of:
    a USB universal asynchronous receiver/transmitter (UART) circuit connected to said third and fourth contact points, whereby a differential data is received or sent; and
    a microprocessor connected to said USB UART through a bi-directional connection whereby data to and from the host are sent and received.

3. The smart card of claim 1, wherein said clock module is a ceramic resonator.

4. The smart card of claim 1, wherein the clock module provides for a data transfer rate of 12 Mbps within a tolerance of ±0.25% (±0.2500 ppm).

5. The smart card of claim 1, wherein the clock module provides for a data transfer rate of 480 Mbps within a tolerance of ±500 ppm.

6. The smart card of claim 1, wherein the clock module and card have a combined thickness of 0.84 mm.

7. The smart card of claim 6, wherein the clock module has a thickness of at most 0.6 mm.

* * * * *